(12) United States Patent
Rawer

(10) Patent No.: US 9,164,317 B2
(45) Date of Patent: Oct. 20, 2015

(54) DEVICE AND METHOD FOR IMPROVING THE RESPONSE TIME OF LIQUID CRYSTAL DISPLAYS

(76) Inventor: Marc Rawer, Stuttgart (DE)

( * ) Notice: Subject to any disclaimer, the term of this patent is extended or adjusted under 35 U.S.C. 154(b) by 149 days.

(21) Appl. No.: 13/700,102

(22) PCT Filed: Mar. 28, 2011

(86) PCT No.: PCT/EP2011/001536
§ 371 (c)(1),
(2), (4) Date: Apr. 24, 2013

(87) PCT Pub. No.: WO2011/147500
PCT Pub. Date: Dec. 1, 2011

(65) Prior Publication Data
US 2013/0201423 A1    Aug. 8, 2013

(30) Foreign Application Priority Data

May 26, 2010  (DE) .......................... 10 2010 021 495
Oct. 15, 2010  (DE) .......................... 10 2010 048 423

(51) Int. Cl.
*G02F 1/133*  (2006.01)
*G02F 1/1335* (2006.01)
*G02F 1/1333* (2006.01)
*G09G 3/34*   (2006.01)

(52) U.S. Cl.
CPC .... *G02F 1/133603* (2013.01); *G02F 1/133382* (2013.01); *G09G 3/3406* (2013.01); *G09G 2320/041* (2013.01); *G09G 2320/0646* (2013.01); *G09G 2360/16* (2013.01)

(58) Field of Classification Search
CPC ................. G92F 1/133382; G92F 1/133615; G92F 2001/133607; G09G 2320/041
USPC .......................................................... 349/69
See application file for complete search history.

(56) References Cited

U.S. PATENT DOCUMENTS

| | | |
|---|---|---|
| 5,164,849 A | 11/1992 | Evans et al. |
| 6,133,979 A | 10/2000 | Komatsu et al. |
| 6,211,852 B1 | 4/2001 | Oono et al. |
| 2002/0021292 A1 | 2/2002 | Sakashita |
| 2006/0127081 A1 | 6/2006 | Lee et al. |

FOREIGN PATENT DOCUMENTS

| | | |
|---|---|---|
| EP | 0438093 A2 | 7/1991 |
| EP | 1372022 A2 | 12/2003 |
| EP | 1973092 A2 | 9/2008 |
| JP | H04-204415 | 7/1992 |
| JP | H05-289058 | 11/1993 |
| JP | H09-281469 | 10/1997 |
| JP | H10-333124 | 12/1998 |

(Continued)

OTHER PUBLICATIONS

German Office Action dated Dec. 10, 2013.

(Continued)

*Primary Examiner* — Phu Vu
(74) *Attorney, Agent, or Firm* — Fletcher Yoder, P.C.

(57) ABSTRACT

The invention relates to a display device, comprising an illumination means and a liquid crystal display. The illumination means also serves to heat the liquid crystal display, and control means may control the brightness of an image displayed via the liquid crystal display.

11 Claims, 1 Drawing Sheet

(56) References Cited

FOREIGN PATENT DOCUMENTS

| | | |
|---|---|---|
| JP | 2002-031846 | 1/2002 |
| JP | 2003-207761 | 7/2003 |
| JP | 2004-102222 | 4/2004 |
| JP | 2008151989 | 7/2008 |
| JP | 2009-116036 | 5/2009 |

OTHER PUBLICATIONS

PCT Notification of Transmittal of Translation of the International Preliminary Report on Patentability mailed Dec. 6, 2012.
International Search Report for application No. PCT/EP2011/001536 mailed Jun. 16, 2011.
Japanese Office Action delivered Oct. 21, 2014.
Chinese Office Action dated Sep. 16, 2014.
Chinese Office Action Mailed May 19, 2015.

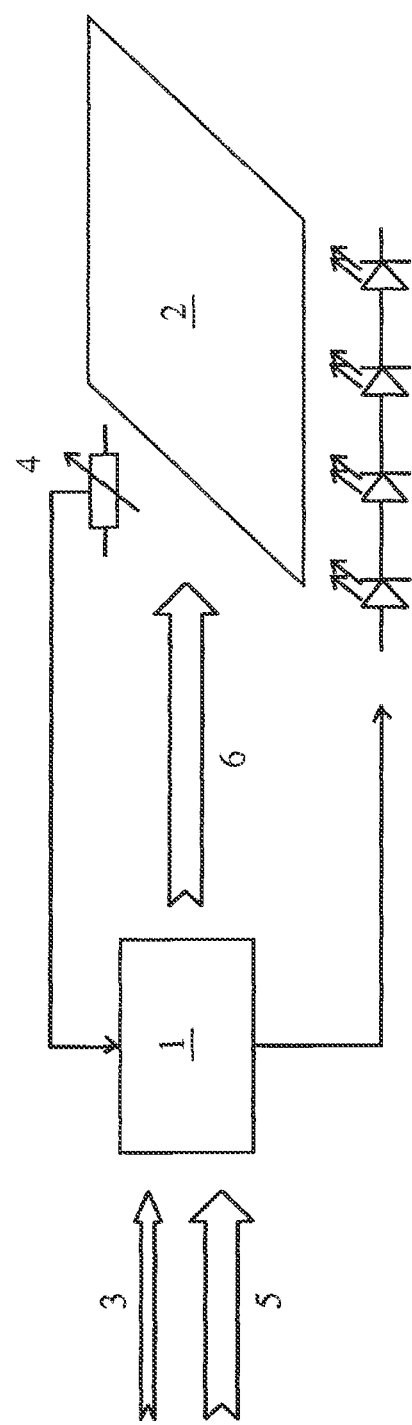

DEVICE AND METHOD FOR IMPROVING THE RESPONSE TIME OF LIQUID CRYSTAL DISPLAYS

CROSS REFERENCE TO RELATED APPLICATIONS

This application claims priority from and the benefit of PCT Application No. PCT/EP2011/001536, filed on Mar. 28, 2011; German Patent No. DE 10 2010 021 495.7, filed on May 26, 2010; and German Patent DE 10 2010 048 423.7, filed on Oct.15, 2010, which are herein incorporated by reference.

BACKGROUND

The invention relates to a display device, comprising an illumination means and a liquid crystal display.

Display devices comprising liquid crystal displays (LCDs) have been used for many years in many different fields of technology. They are widely used for example in television sets, computer screens and mobile phones.

An important parameter for the quality of the image representation by means of a liquid crystal display, in particular when representing moving images, is the response time of the liquid crystal display, wherein the response time specifies the time duration which is needed for a pixel of the liquid crystal display to move from a first given state to a second given state. If the response time of the liquid crystal display is too long, a in-motion unsharpness (the so called, motion blur') occurs when representing fast moving images, which is conceived as disadvantageous by a viewer. Accordingly, there exists a great need for providing liquid crystal displays with the shortest possible response time.

Further, it is well known that the response time of liquid crystal displays is temperature-dependent and increases with decreasing temperatures, in particular in the temperature range between ca. −40° C. and 0° C. In order to ensure an image representation even in such a temperature range, it is therefore required to compensate or prevent the temperature-dependent increase of the response time.

In this context, the document EP 1 973 092 A2 proposes a method for a display device comprising a liquid crystal display, wherein an improvement of the response time of liquid crystal displays is achieved by multiplying the applied voltage, which is necessary for the change of state of a pixel of the liquid crystal display, with a specific factor, the so called, overdrive parameter'. Yet it is unfavorable of this method that the overdrive parameter to be used are temperature-dependent and therefore either have to be determined by very extensive calibration measurements or have to be estimated by means of complex algorithms, thus rendering the proposed method comparably time-consuming and/or computationally intensive. Furthermore, measurements show that this approach is virtually ineffective in the temperature range between −40° C. and 0° C.

In contrast, the document EP 0 438 093 A2 proposes a display device comprising a liquid crystal display, a temperature sensor and a heating means, wherein temperature changes of the liquid crystal display are monitored by means of the temperature sensor and compensated by means of the heating means, thus ensuring a working temperature which is suitable for the liquid crystal display and thus ensuring an essentially constant and suitably short response time of the liquid crystal display. This display device is disadvantageous because the usage of an additional heating means results in higher costs and decreases the transmission of the glass and thus the optical light output ratio.

SUMMARY

It is therefore the object of the present invention to provide a display device with a liquid crystal display, in which a temperature-dependent increase in the response time of the liquid crystal display is prevented, and wherein the display device is realized in a particularly cost-effective manner.

This object is achieved by a display device comprising a means, in particular an illumination means and a liquid crystal display, wherein the means is configured for illuminating a liquid crystal display, wherein furthermore the means is provided for heating of the liquid crystal display, wherein in the means is preferably provided as an illumination means, more preferably as an LED. According to the invention, it is hereby possible that the liquid crystal display is heated by means of the illumination means in such a way that a sufficiently high operating temperature of the liquid crystal display is provided so that a temperature-dependent increase in the response time of the liquid crystal display is reduced. Compared with the prior art, the heating of the liquid crystal display according to the subject matter of the invention is thus realized without an additional heating means and is therefore particularly economical and compact.

It was extremely surprising and not expectable for the person skilled in the art that the illumination of the liquid crystal display and its temperature control can be effected with a means without the display quality is diminished. The display device according to the invention is constructed in a very simple way and very easy to use.

In a preferred embodiment of the subject invention, the display device comprises a temperature sensor and a control means, wherein the temperature sensor is provided for measuring the temperature of the liquid crystal display, wherein the temperature sensor is connected to the control means, wherein the control means is provided for controlling the illumination means, and wherein the control means preferably is a microcontroller. It is hereby possible that the temperature sensor measures the temperature of the liquid crystal display and transmits the measured temperature value to the control means. The control means is preferably provided such that the control means adjusts the intensity of the illumination means in accordance with the deviation between the measured temperature value of the liquid crystal display and a predetermined desired temperature, so that in case of the temperature of the liquid crystal display being too low, a heating of the liquid crystal display is caused by an increase of the intensity of the illumination means and that in case of the temperature of the liquid crystal display being too high, a cooling of the liquid crystal display is caused by a reduction in the intensity of the illumination means. Thus, it is advantageously possible that the liquid crystal display is maintained at a predetermined desired temperature which is particularly suitable for operation and thus a substantially constant and sufficiently short response time of the liquid crystal display is ensured.

It is furthermore preferable that the control means for controlling the liquid crystal display is provided, wherein the control means are configured for receiving and processing of image information in the form of digital data. In this preferred embodiment, it thereby possible that by means of the control means the brightness values of the image pixels of the image to be displayed, which are included in the received image information, can be adjusted according to the intensity of the illumination means, and that the liquid crystal display is controlled by the control means according to the adjusted brightness values. This has the advantage that, when varying the intensity of the illumination means, in particular for regulating the temperature of the liquid crystal display, the brightness of the displayed image perceived by an observer can be maintained substantially constant. For example, it is preferably intended that when multiplying the intensity of the illumination means by a certain intensity factor, the brightness values of the image pixels of the image to be displayed, which are included in the received image information, are divided by the same intensity factor. Thus, even with a high intensity of the illumination means, an image representation is provided which is perceived as pleasant by an observer. Especially in the operation of the display device according to the present invention in a low light environment, such as at dusk or at night, an image representation which is too bright and thus blinding for an observer can advantageously be avoided.

A further object of the present invention relates to a method for operating the display device according to the present invention, wherein by means of the lighting means the liquid crystal display is heated. Is preferred according to the invention that the temperature of the liquid crystal display is measured by means of the temperature sensor, wherein the measured temperature value is transmitted to the control means, wherein the measured temperature value is compared with a predetermined desired temperature by the control means, wherein the control means adjusts the intensity of the illumination means by a corrective intensity factor in case of a deviation between the measured temperature value and the predetermined desired temperature. Particularly preferably, it is also envisaged that the control means receives image information of the image to be displayed in the form of a digital data stream, wherein the control means furthermore adapts the brightness values of the image pixels, which are underlying the received image information, to the intensity of the illumination means such that the brightness of the image perceived by an observer remains substantially unchanged, wherein the control means controls the liquid crystal display according to the adjusted brightness values. Very particularly preferred, the brightness values of the image pixels are divided by the intensity factor in order to adapt the brightness values of the image pixels to the intensity of the illumination means. It is therefore possible by means of a relatively simple process that the temperature of the liquid crystal display is maintained at a suitable operating temperature and that thus a temperature-dependent increase in the response time of the liquid crystal display is reduced, while at the same time an image representation is ensured which is perceived as particularly pleasant by an observer by the brightness adjustment of the image to be displayed.

Preferably, the intensity of the illumination means is controlled by the magnitude of the electrical supply current of the illumination means. More preferably, the intensity of the illumination means is controlled by pulse width modulation. Thus, it is advantageously possible to regulate the intensity of the illumination means precisely even in the range of low intensities.

DRAWINGS

The invention is further illustrated by means of drawings and by providing further advantages and details.

FIG. 1 shows a flowchart of an embodiment of the display device according to the present invention.

DETAILED DESCRIPTION

In FIG. 1, a flowchart of an embodiment of the display device according to the present invention is shown. According to the illustrated embodiment, the display device comprises a control means 1, a liquid crystal display 2 and an illumination means 3, wherein the illumination means 3 is provided for illuminating the liquid crystal display 2, wherein the illuminating means 3 is further provided for heating the liquid crystal display 2, wherein the control means 1 is provided for controlling the liquid crystal display 2 and for controlling the intensity of the illumination means 3. Furthermore, the display device comprises a temperature sensor 4 at the liquid crystal display 2, wherein the temperature sensor 4 is connected to the control means 1. The control means 1 is further provided for receiving an image information 5 of an image to be displayed in the form of a digital data stream, wherein the image information 5 comprises in particular the color values and the brightness values of each image pixel of the image to be displayed. For example, the image information 5 comprises the color values and the brightness values of each image pixel as RGB values, wherein the color values and the brightness values of the image pixels can also be represented as values within a different color space. The control means 1 then controls the pixels of the liquid crystal display 2 in accordance with the color values and the brightness values of the image pixels of the received image information 5 by means of control signals 6, wherein in particular the color values and the brightness values of the image pixels can previously be modulated by the control means 1. The temperature sensor 4 measures the temperature of the liquid crystal display 2 and transmits the measured temperature value to the control means 1. The control means 1 compares the measured temperature value with a predetermined desired temperature, for example with an operating temperature of the liquid crystal display 2 suitable for a sufficiently short response time of the liquid crystal display 2 and adjusts the intensity of the illumination means 3 by an intensity factor such that the temperature of the liquid crystal display 2 essentially matches the predetermined desired temperature in case of deviations between the measured temperature value and the predetermined desired temperature. According to the present invention, it is thus possible that the liquid crystal display 2 is maintained at a suitable operating temperature, so that an increase of the response time as a result of a decreasing temperature is reduced. According to the present invention, it is further envisaged that the image information 5 received by the control means 1 is processed by the control means 1 such that the received color and brightness values of the image pixels of the image to be displayed can be adapted to the intensity of the illumination means 3, such that even when deviations of the intensity of the illumination means 3 occur, the brightness of the image representation as perceived by an observer remains substantially constant. Preferably, the received image information 5 comprises the color and brightness values of the image pixels as values in the HSV color space, so that only the brightness (V-values) has to be divided by the intensity factor used for controlling the intensity of the illumination means 3 to adapt the brightness of the image pixels to the intensity of the illumination means 3. It is obvious to those skilled in the art that the received image information 5 may comprise the color and brightness values of the image pixels as values of another color space, for example as values of the RGB color space, and that the values of other color spaces are firstly converted into values of a suitable color space, for example the HSV color space, by the control means 1. After the processing of the brightness values of the image pixels by the control means 1, the control means 1 controls the pixels of the liquid crystal display 2 in accordance with the adjusted color and brightness values of the image pixels of the image to be displayed by means of the control signals 6, so that the brightness of the image representation remains substantially constant, even when a change in the intensity of the illumination means 3 occurs. By the display device according to the present invention, it is thus advantageously possible for the illumination means 3 to be used for heating of the liquid crystal display 2, thus reducing an increase in the response time of the liquid crystal display 2 for decreasing temperatures, and simultaneously to provide an image representation perceived as pleasant for an observer.

The invention claimed is:

1. A display device comprising:
   an illumination device configured to illuminate and heat a liquid crystal display;
   a temperature sensor configured to determine a temperature of the liquid crystal display and to output a signal indicative of the temperature; and
   a control device communicatively coupled to the illumination device and to the temperature sensor, wherein the control device is configured to determine an illumination intensity factor based on the signal, to control an intensity of the illumination device based on the illumination intensity factor, and to adjust a brightness of image data received by the control device based on the illumination intensity factor.

2. The display device according to claim 1, wherein the illumination device comprises an LED.

3. The display device according to claim 1, wherein the control device is configured to receive and to process the image data.

4. A method for operating the display device according to claim 1, wherein by heating the illumination device, the liquid crystal display is heated as well.

5. The method according to claim 4, wherein the intensity of the illumination device is adjusted such that an image perceived by an observer remains substantially unchanged as far as its brightness is concerned.

6. The method according to claim 5, wherein a brightness value of image pixels of the image data is divided by the illumination intensity factor to produce an adjusted value, and the adjusted value is kept constant by the control device.

7. The display device according to claim 2, wherein the LED comprises an intense LED.

8. The display device according to claim, wherein the LED comprises an OLED.

9. The display device according to claim 1, wherein the temperature sensor comprises a negative temperature coefficient thermistor.

10. The display device according to claim 1, wherein the temperature sensor comprises a positive temperature coefficient thermistor.

11. The display device according to claim 1, wherein the image data comprises digital image data.

\* \* \* \* \*